July 26, 1949.  E. N. JACOBI  2,477,063
DRIVE LINK FOR DOOR LOCKS
Filed July 20, 1948
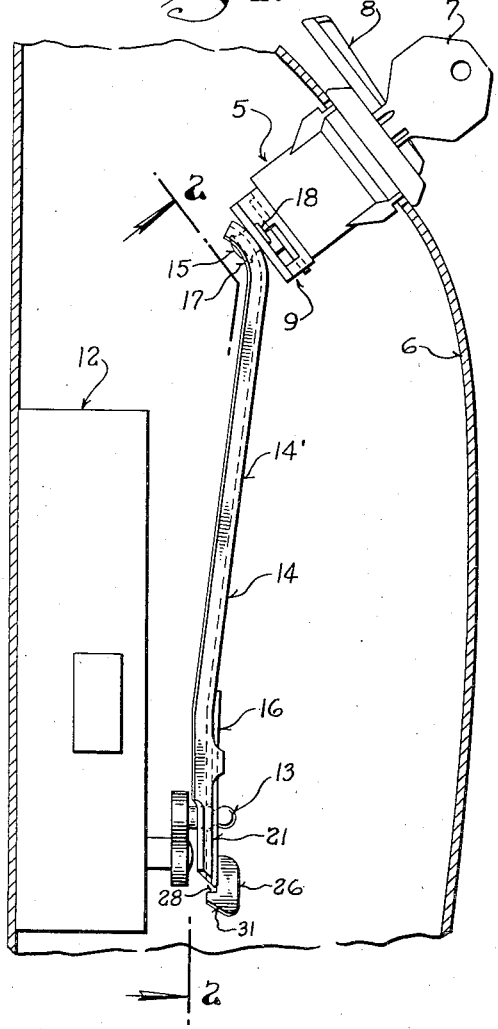
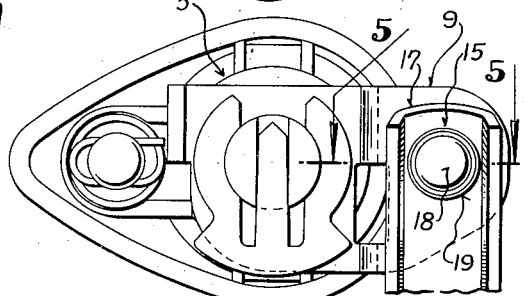
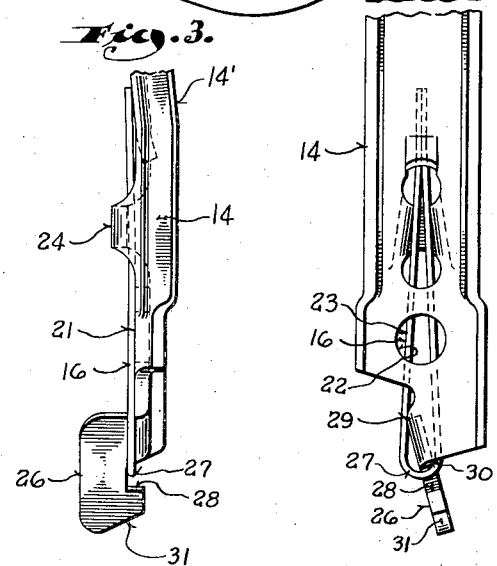
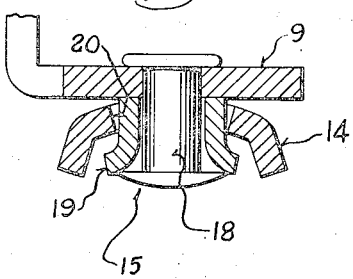
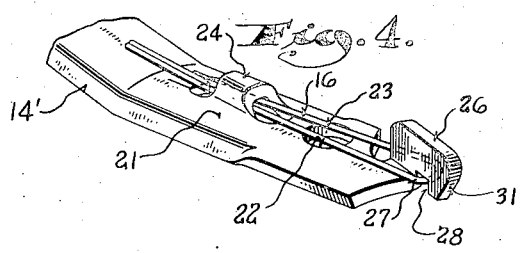
Inventor
Edward N. Jacobi
By Ira Milton Jones
Attorney Patented July 26, 1949

2,477,063

UNITED STATES PATENT OFFICE 2,477,063

DRIVE LINK FOR DOOR LOCKS

Edward N. Jacobi, Milwaukee, Wis., assignor to Briggs & Stratton Corporation, Milwaukee, Wis., a corporation of Delaware Application July 20, 1948, Serial No. 39,765

5 Claims. (Cl. 74—579)

1

This invention relates to automobile door locks and refers more particularly to a device for connecting the driven member of an automobile door lock with the door latch mechanism.

It is customary at the present time to mount door locks on automobile doors adjacent to the door handles. The driven member of the lock is usually connected with the door latch mechanism by means of an elongated link so that key operation of the door lock effects locking of the latch mechanism to prevent opening of the door, or unlocking of the latch to enable opening of the door by its handle. Since the lock is installed in the door after the latter has been substantially assembled, installation of the connecting link presents serious difficulties because of the limited space between the inner and outer walls of double wall automobile doors and the limited access to such space afforded by a relatively narrow slit in the stile edges of the doors.

To facilitate installation the connecting link usually has one of its ends permanently secured to the lock mechanism before the lock is placed in the door, and the other end of the link must therefore be readily connectible to the latch mechanism after the link has been put into its relatively inaccessible position between the door walls.

To this end the disabling mechanism of the latch device is frequently provided with a ball headed stud movable in opposite directions to effect locking and unlocking of the latch mechanism, and the free end of the link is provided with a securement device which is adapted to be slipped over the head of the stud and which is cooperable with the enlarged head of the stud to effect a substantially permanent connection between it and the link.

Heretofore the securement device has been a relatively intricate structure, difficult to assemble to the link and difficult to install in the limited space available for the operation. Hence, it is an object of this invention to provide an exceedingly simple securement device of the character described which will not require complicated operations to effect its installation within the confined space between the walls of an automobile door.

Another object of this invention resides in the provision of an improved link for connecting the driven element of an automobile door lock with the latch mechanism on the door, which link is permanently secured to said driven element by an exceedingly simple universal joint that allows the link to move in every direction while transmitting

2 pushing and pulling forces from the driven element of the lock to the latch disabling mechanism.

Still another object of this invention resides in the provision of a link of the character described which will be strong and inexpensive to produce and which may be very readily installed within the narrow confines of a double wall automobile door.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof, and in which:

Figure 1 is a fragmentary vertical section through an automobile door showing the link of this invention connecting the door lock with the door latch;

Figure 2 is a rear elevational view of the link and lock taken along the line 2—2 in Figure 1;

Figure 3 is a detail side elevational view of the lower portion of the link of this invention;

Figure 4 is a detail perspective view of the lower end portion of the link of this invention; and Figure 5 is a sectional view taken along the line 5—5 in Figure 2.

Referring now more particularly to the accompanying drawing in which like numerals designate like parts throughout the several views, the numeral 5 designates generally the case of a conventional key operated cylinder lock mounted in the outer wall 6 of a double wall automobile door. The lock has conventional tumbler mechanism (not shown) actuated by a key 7, and has a pivoted cover 8 on its front face to protect the mechanism from foreign matter which might enter through the key slot.

The driven element 9 of the lock may be of any suitable type and is essentially in the form of a lever having a lost motion connection with the rotatable lock cylinder so as to be oscillated by the cylinder. The particular type of lever 9 and its connection to the lock cylinder forms the subject matter of my copending application, Serial No. 46,091 for Locks, filed August 25, 1948.

The door latch mechanism, designated generally by the numeral 12, may be of any known type and may have the door handle (not shown) integral therewith or the door handle may be connected to the latch mechanism by means of suitable linkage (not shown).

In the present instance the disabling mechanism of the door latch is actuated by a ball headed stud 13 movable in opposite directions to effect locking and unlocking of the latch device. Motion of the driven element 9 of the door lock is transmitted to the stud 13 by means of a link 14, the upper end of which is secured to the driven element by means of an improved and unusually simple universal joint 15 about to be described; and the lower end of the link is secured to the ball headed stud 13 by means of a U-shaped spring clip 16 also described more fully hereinafter.

The upper end portion 17 of the link 14 is curved out of the plane of the medial portion 14' thereof and like the body of the link is arcuate in cross-section so that it presents a convex rocker-like surface at the point at which it abuts the driven element 9 of the lock. A rivet 18 passes through the outer end of the driven element and through a spacer sleeve 19, the length of the sleeve being somewhat greater than the thickness of the material of the link, and a loosely fitting hole is provided in the upper curved end of the link through which the spacer sleeve passes. By virtue of the fact that the sleeve does not snugly engage the edges of the hole 20, and the spacer 19 permits a degree of motion of the upper end of the link axially of the rivet, it will be seen that the convex upper end of the link is free for limited rocking movement about the rivet in all directions to provide a universal joint capable of transmitting pushing and pulling forces from the driven element into the link and thus to the ball headed stud 13.

The outer end of the spacer 19 is flared outwardly to a diameter greater than that of the hole 20 in the link so as to preclude separation of the link from the driven element 9.

The lower end portion of the link 14 is relatively flat but is bent to lie at a slight angle to the body 14' of the link with one flat face 21 thereof facing in the direction of the door lock and away from the latch mechanism 12. A hole 22 in the flat lower end of the link is adapted to receive the ball head on the stud 13, the hole being large enough in diameter to permit the head of the stud to readily pass therethrough. The substantially U-shaped spring clip 16 flatwise overlies the front face 21 with the medial portions of its legs straddling the hole 22, as at 23, so that the legs extend across the hole adjacent to its opposite side edges but inwardly thereof. Hence, the two legs of the spring 16 are adapted to securely clamp around the reduced neck of the stud 13 immediately below the enlarged ball head thereon.

The spring clip is secured to the lower end portion of the link by means of a strap or bridge 24 struck upwardly from the flat surface 21 and straddling the medial portions of the legs of the spring clip. The free end portions of the spring clip legs overlie the body portion 14' of the link, and since the body of the link is disposed at a slightly outward angle with respect to the flat face 21, this angled portion of the link, in cooperation with the strap 24, tends to bias the legs of the spring clip into secure flatwise engagement with the flat face 21.

A lug or ear 26 turned upwardly from the flat face 21, at the lower extremity of the link and substantially normal thereto, serves as an anchor for the closed end 27 of the spring clip and thus cooperates with the strap 24 and the angle at the junction of the body portion 14' with the end of the link to maintain the clip properly assembled on the link. The lug 26 has a notch or cutout 28 in its inner edge in which the closed end 27 of the spring clip is received, thus precluding longitudinal displacement of the spring clip, and the lug is disposed substantially diagonally across the inside of the closed end of the clip so that one end edge of the lug abuts the inner side of one leg of the spring clip as at 29, while the edge of the cutout abuts the inner surface of the other leg of the spring clip as at 30, thus effectively precluding sidewise shifting of the clip in the plane of the face 21.

The lowermost edge of the lug 26 is upwardly and inwardly angled as at 31, see Figures 1 and 3, to facilitate assembly of the spring clip onto the link. Such assembly is readily accomplished by inserting the two legs of the spring clip under the strap 24 and moving the clip upwardly toward the body of the link, the closed end of the clip being cammed into position in the cutout 28 by the inclined surface 31 on the lug.

With the spring clip in place and the link universally connected to the driven element of the lock by means of the rivet 18, the lock and link assembly is placed into the door wall and the lock securely fastened therein in the usual manner. It is then necessary only to align the hole 22 in the lower end of the link with the ball head on the stud 13, and upon the application of pressure to the link to move its lower end toward the latch mechanism, the round head of the stud cams the medial portions of the clip legs apart and the legs spring back together about the reduced neck of the stud to clamp the same securely between them.

From the foregoing description taken together with the accompanying drawing it will be readily apparent that this invention provides an improved link for connecting the driven element of an automobile door lock with the disabling mechanism of a door latch and that the same is simple and inexpensive to build and extremely easy to install within the limited operating space available between the two walls of an automobile door.

What I claim as my invention is:

1. Means for connecting the driven element of an automobile door lock with latch mechanism on the door having a ball headed stud movable in opposite directions to lock and unlock the latch mechanism, said means comprising: an elongated link the upper end of which is connectable with the driven element of the lock and the lower end of which is relatively flat and has a hole in which the ball headed stud is adapted to be received; means for connecting the lower end of the link with the ball headed stud, said means including a substantially U-shaped spring; and means on the link for holding the spring on said lower end of the link, against one side thereof, with the medial portions of its legs overlying the hole in the link, said means restraining the ends of the legs against spreading apart so that said legs are capable of yieldingly clamping the neck of the ball headed stud between them when the same is projected through the hole.

2. Means for transmitting motion from the driven element of an automobile door lock to a ball headed stud on the door latch mechanism so as to enable locking and unlocking of said latch mechanism by the door lock, comprising: an elongated link, one end of which is connectable with the driven element of the door lock and the opposite end of which has a hole in which the ball headed stud is adapted to be received; integral spring retaining means on one face of said opposite end of the link at opposite sides of the hole therein; and a substantially U-shaped spring held in place on said face by the retaining means with its legs overlying said hole and spaced apart a distance to firmly clamp beneath the head of the stud when the same is projected through said hole.

3. Means for connecting the driven element of an automobile door lock with latch mechanism on the door provided with a ball headed stud movable in opposite directions to lock and unlock the latch mechanism, said means comprising: an elongated link having its upper end portion curved to rocker-like shape and provided with a hole in which a rivet on the driven element of the lock is adapted to fit loosely to form a universal joint connection between the link and the door lock; a hook-like lug on the lower extremity of said link; a strap on the lower end of the link spaced a distance inwardly from said lug; and a substantially U-shaped spring having its closed end engaged under said hook-like lug and its legs confined under said strap so that the flexible medial portions of the legs of the spring are relatively close together and centered over a hole in the lower end of the link between said strap and lug and of a size to allow passage of the ball head on the stud therethrough to be yieldingly clamped between the legs of the spring.

4. Means for connecting the driven element of an automobile door lock with latch mechanism on the door provided with a ball headed stud movable in opposite directions to lock and unlock the latch mechanism, said means comprising: an elongated link, the upper end of which is connectable with the driven element of the lock; a substantially U-shaped spring clip adapted to lie flatwise against one face of the lower end of the link; and means for holding said spring clip in place on the lower end of the link, including a lug on the lower extremity of the link disposed substantially diagonally within the closed end of the U-shaped clip, and a strap extending across the legs of the U-shaped spring a distance from said lug, said strap holding the legs of the spring together and centered over a hole in the lower end of the link between the strap and lug and through which the ball head of the stud is adapted to be projected so that the legs of the spring may tightly clamp the stud beneath the ball head thereon.

5. The connecting means set forth in claim 4 wherein said lower end of the link is bent to lie at a slight angle to the adjoining portion of the link, and wherein the extremities of the legs of the spring extend onto said adjoining portion of the link to be raised thereby for tensioning the clip in a manner to bias the same firmly against said face on the lower end of the link.

EDWARD N. JACOBI.

No references cited.